F. H. CATHCART.
CHANGE SPEED GEAR TRANSMISSION MECHANISM.
APPLICATION FILED NOV. 23, 1916.
1,282,540.
Patented Oct. 22, 1918.
5 SHEETS—SHEET 1.
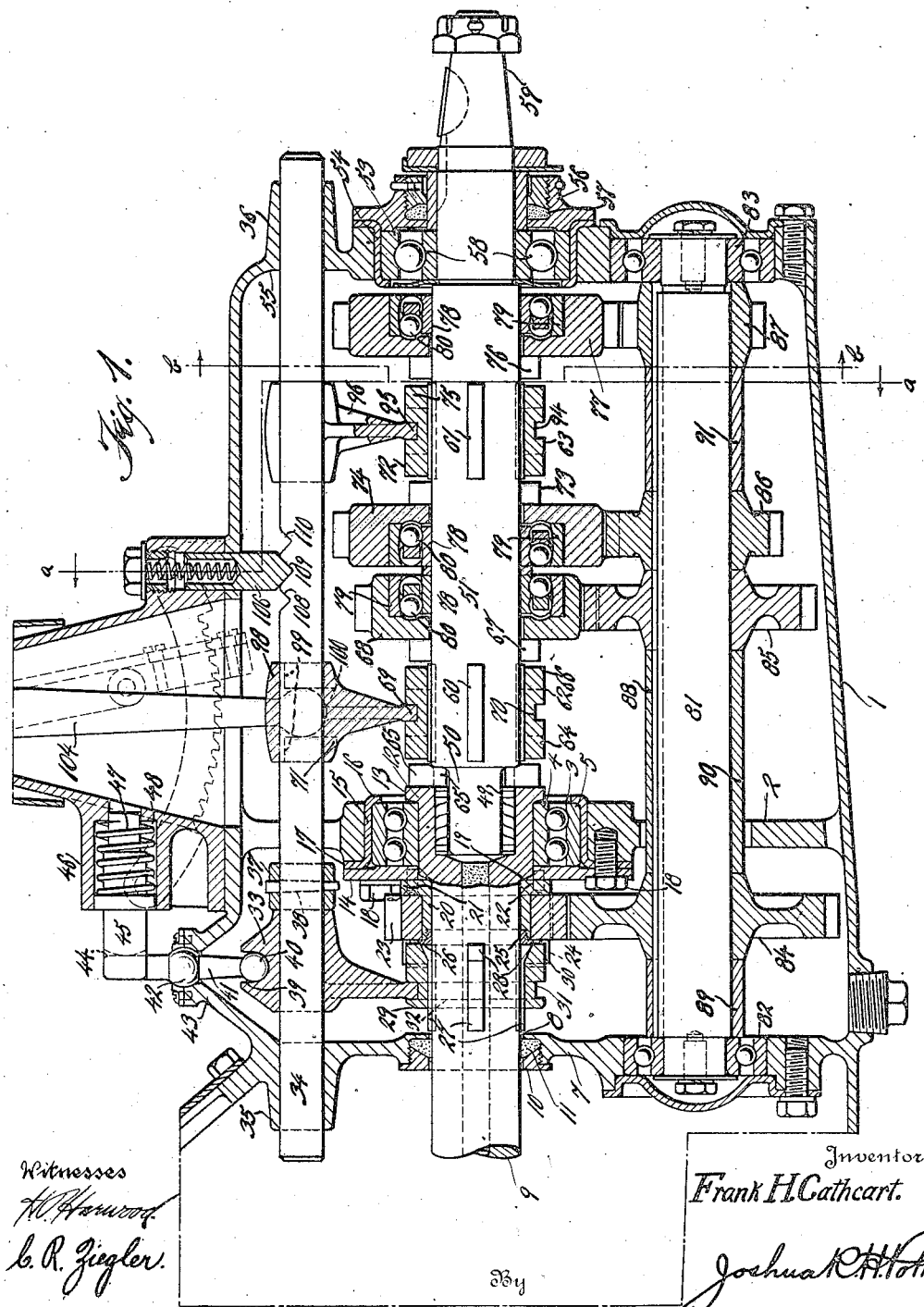
Witnesses
H. Harwood
C. R. Ziegler
Inventor
Frank H Cathcart.
By Joshua R. H. Potts
His Attorney

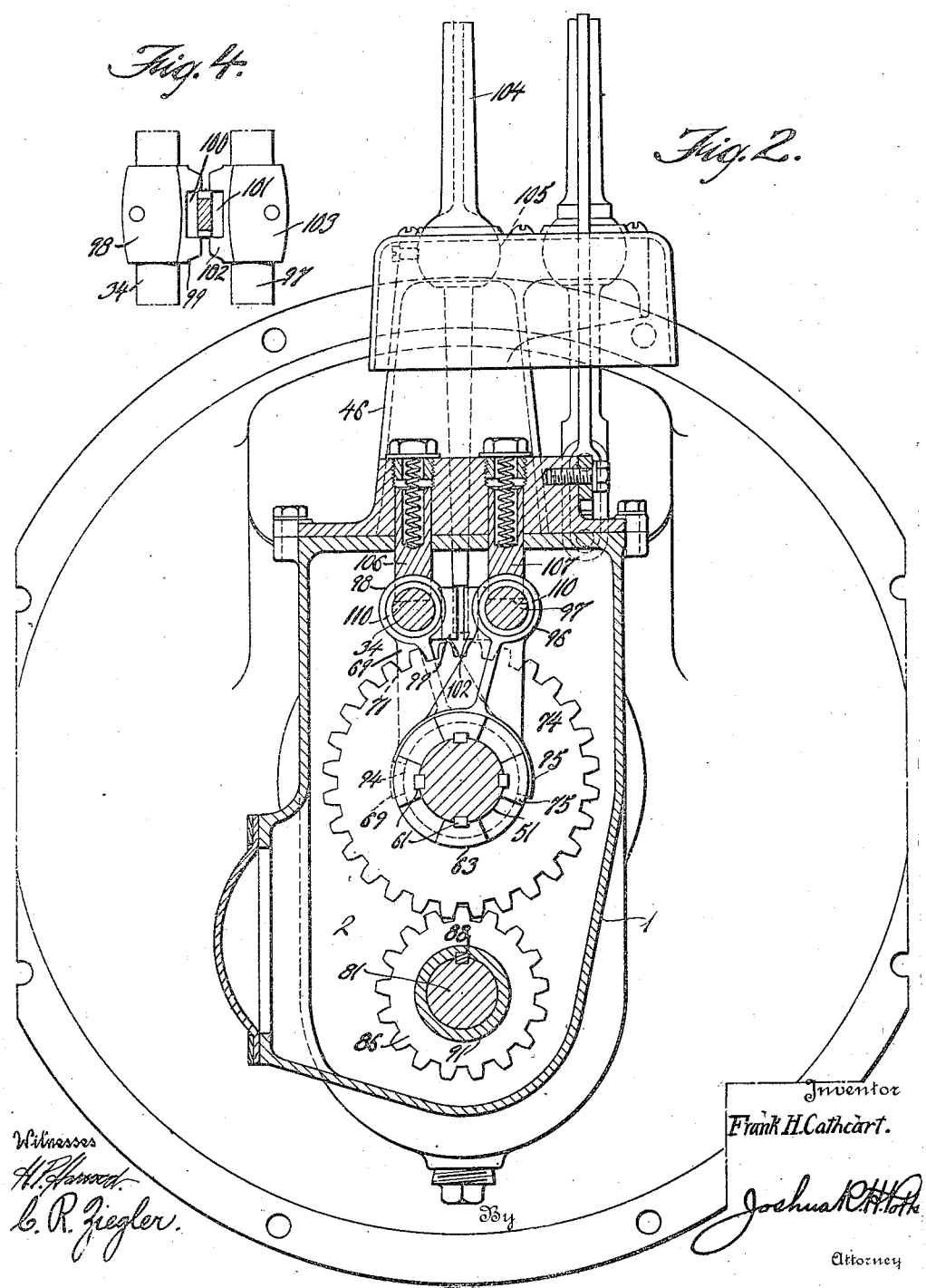

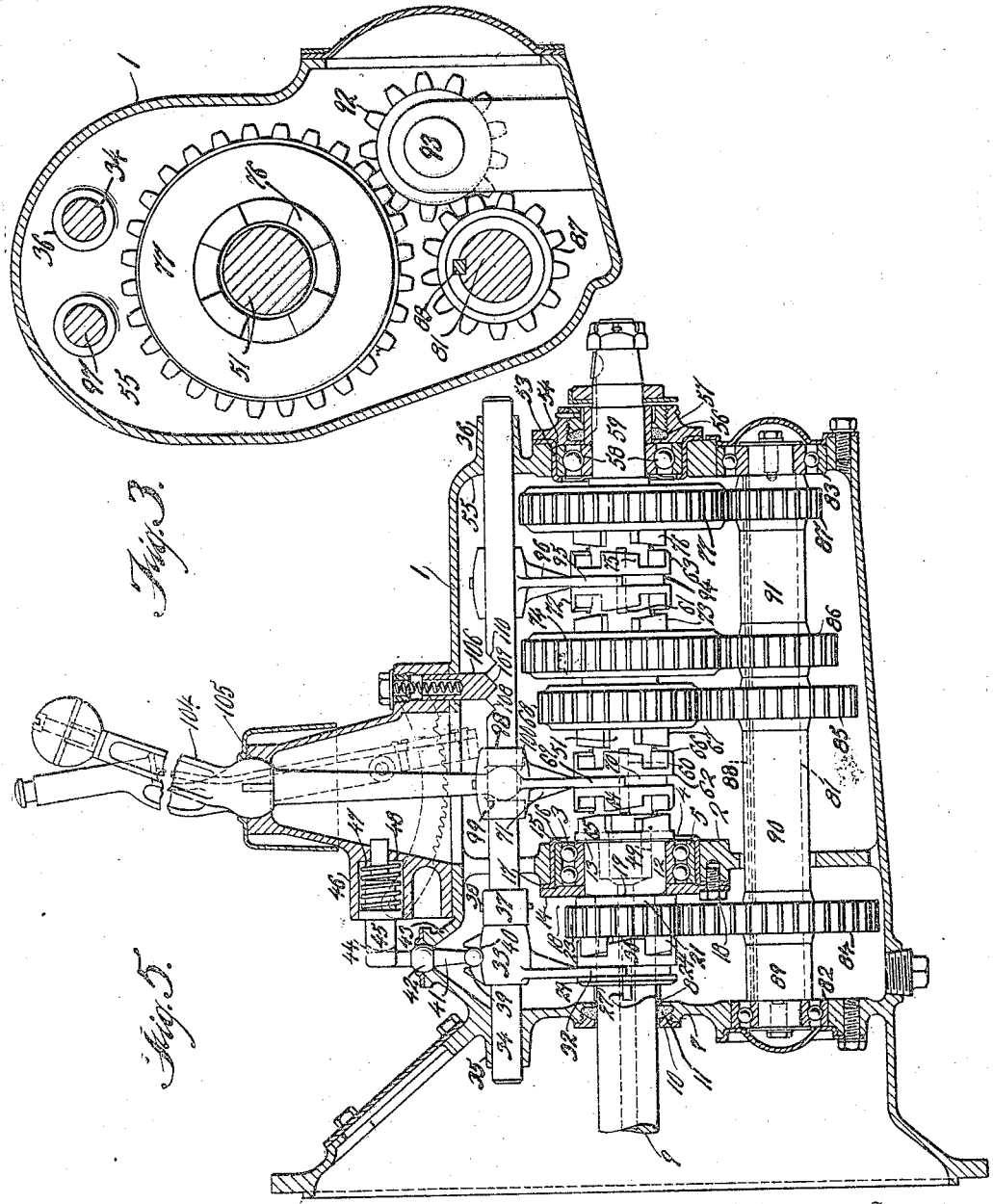

F. H. CATHCART.
CHANGE SPEED GEAR TRANSMISSION MECHANISM.
APPLICATION FILED NOV. 23, 1916.

1,282,540.

Patented Oct. 22, 1918.
5 SHEETS—SHEET 4.

Witnesses
Inventor
Frank H Cathcart.

His Attorney

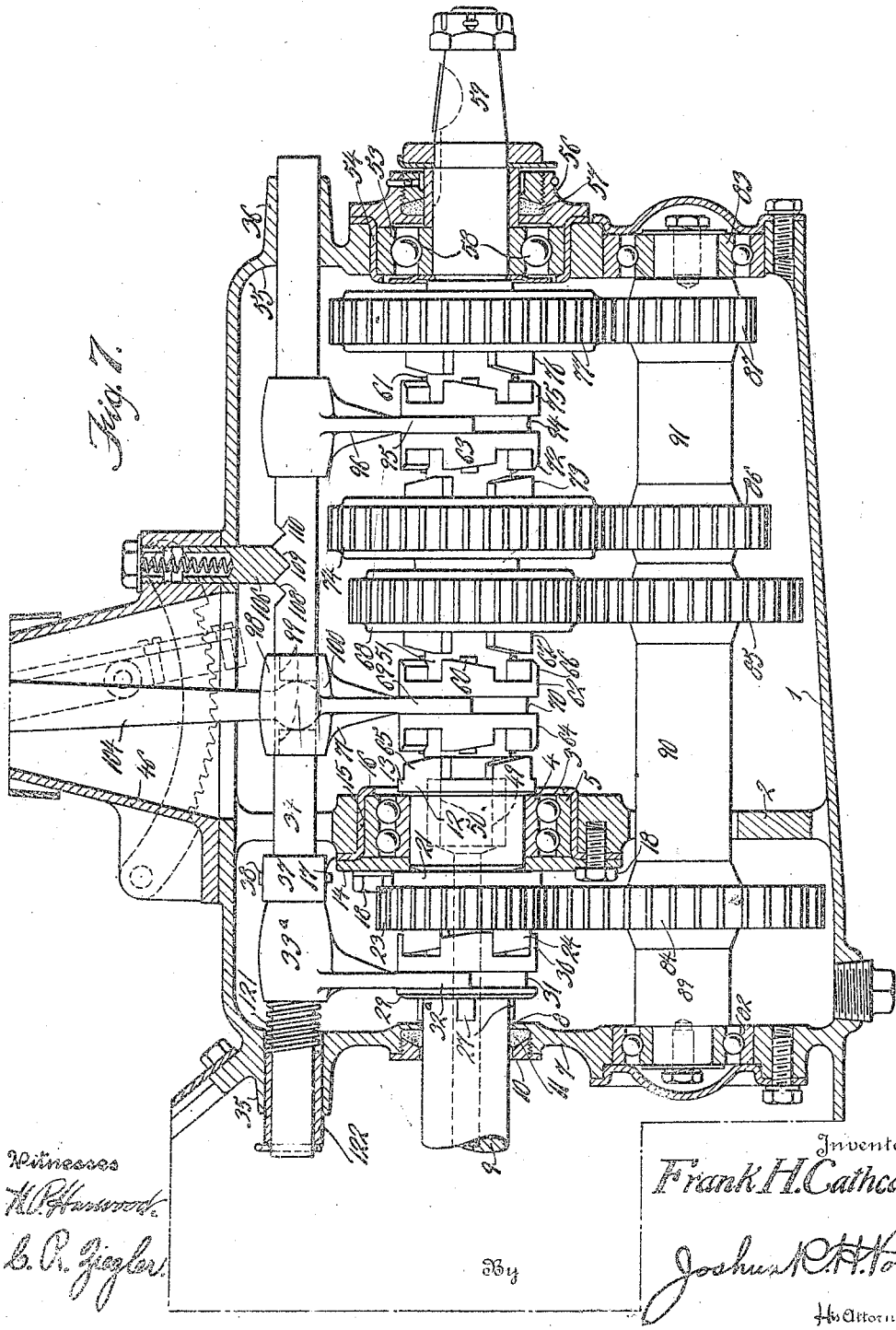

UNITED STATES PATENT OFFICE.

FRANK H. CATHCART, OF COTTAGE PARK, VIRGINIA.

CHANGE-SPEED-GEAR TRANSMISSION MECHANISM.

1,282,540.  Specification of Letters Patent.  Patented Oct. 22, 1918.

Application filed November 23, 1916. Serial No. 132,986.

*To all whom it may concern:*

Be it known that I, FRANK H. CATHCART, a citizen of the United States, residing at Cottage Park, in the county of Alexandria and State of Virginia, have invented certain new and useful Improvements in Change-Speed-Gear Transmission Mechanism, of which the following is a specification.

My invention consists of an improved change speed gear transmission mechanism and is particularly adapted for use on automobiles or other motor driven vehicles but can also be used with advantage any place where a change speed transmission mechanism is required.

One object of my invention is to provide a transmission mechanism employing gears, all of which are non-slidable thereby avoiding breakage of the gears and greatly reducing the noise of the mechanism during its operation.

Another object is to so construct my improved transmission mechanism that it will be durable, of comparatively simple construction, and can be manufactured and installed at a low cost.

A further object is to so make my improved transmission mechanism that it can be operated by a single lever in the manner which is now practically universal to give a number of forward speeds and a reverse, this construction being especially desirable for use on an automobile or other motor driven vehicle.

These objects, and other advantageous ends which will be described hereinafter, I attain in the following manner, reference being had to the accompanying drawings in which—

Figure 1 is a sectional elevation of my invention showing the gears, clutches, and clutch operating means in section.

Fig. 2 is a transverse section on the line a—a of Fig. 1.

Fig. 3 is a transverse section on the line b—b of Fig. 1 showing the gears which operate to form the reverse.

Fig. 4 is a fragmentary plan view of the clutch shifting rods at a point where the shifting lever engages means on said rod for moving either of the rods in opposite directions.

Fig. 5 is an elevation of my invention of similar nature to that shown in Fig. 1 but showing the gears, clutches and clutch moving means in outside view and the casing and bearing portions in section, said casing being designed to be secured to the motor casing in the forward portion of an automobile.

Fig. 7 is an elevation partly in section including certain modifications of the elements of my invention.

Figure 6:
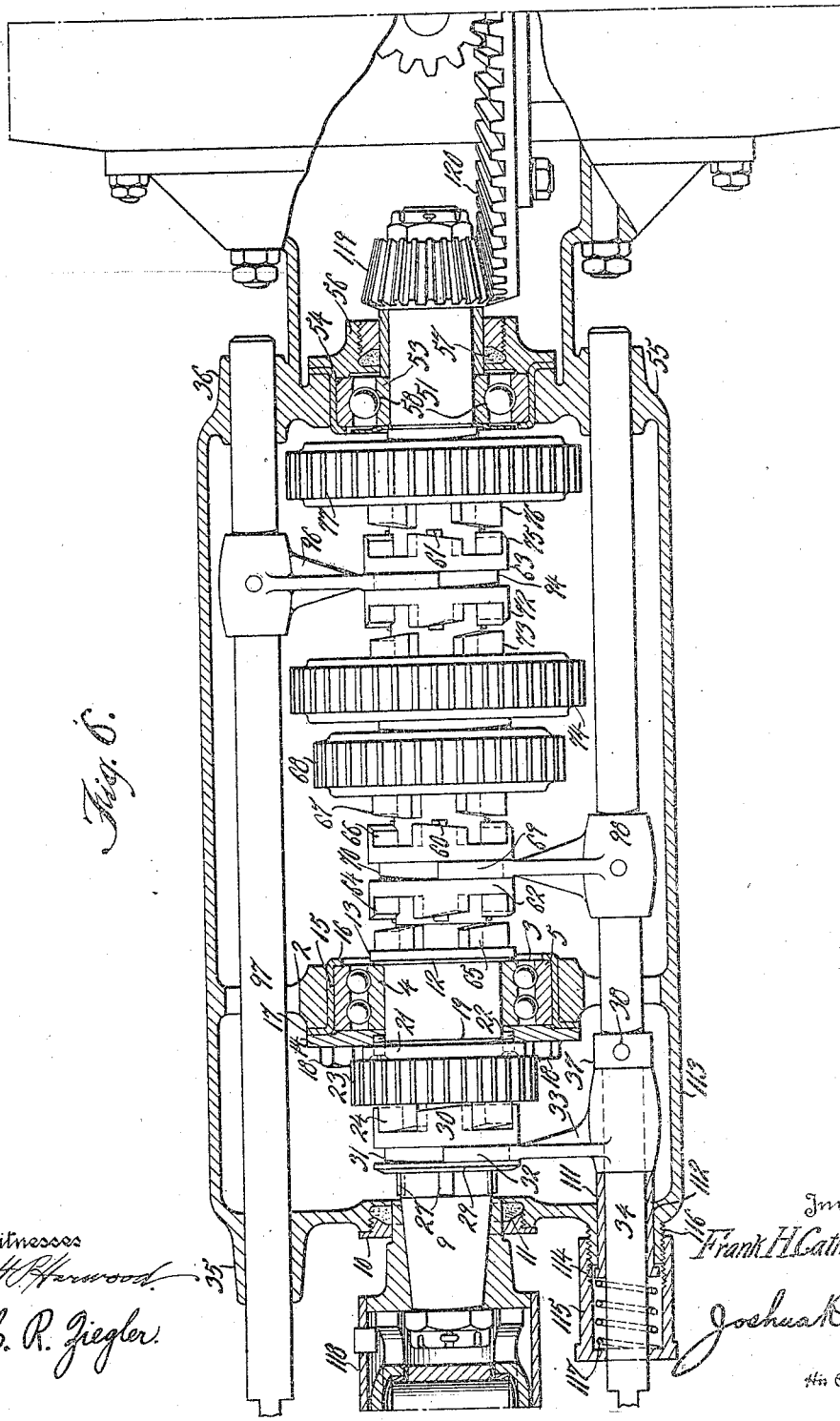
Fig. 6 is a plan view of my invention showing the casing and bearings in section and designed to be placed adjacent the rear driving end of an automobile and having a universal joint connected therewith, so that it may be driven from the motor which is located in a forward position.

Referring to Figs. 1 to 5 inclusive, 1 is a casing forming a housing for the movable portions of my improved transmission mechanism, said casing having a partition 2 which forms a support for a ball bearing 3 preferably of the well known "S. K. F. type" employing inner and outer sleeves 4 and 5 which are spaced apart and form races for balls 6.

The front end 7 of the casing has an opening 8 through which extends a primary drive shaft 9, and a gland or stuffing box 10 surrounds said shaft 9 and forms a closure to retain packing 11, the latter forming a seal for the opening 8 to prevent lubricant, with which the casing 1 is filled, from leaking through said opening 8.

The rear end 12 of the primary drive shaft 9 extends through the sleeve 4 of the bearing 3, the connection between said sleeve 4 and the end 12 being rigid, so that said sleeve 4 rotates with the end 12. A flange 13 is formed on the extreme rear end of the shaft 9 and prevents longitudinal movement of said shaft in a forward direction.

The bearing 3 is inclosed within a housing which is made in two parts 14 and 15. The part 15 has an inwardly turned flange 16 which engages the inner end of the sleeve 5, while the forward end 17 is flanged outwardly and engages the forward surface of the partition 2.

The part 14 forms a front cover plate for the bearing and bolts 18 extend through the parts 14, 17, and the partition 2, thereby securely holding the bearing 3 to said partition.

Furthermore, the cover plate 14 engages the shoulder 19 formed by a reduction of diameter of the shaft 9 and thereby prevents longitudinal movement of said shaft in a rearward direction. A bushing 20 surrounds the shaft 9 and has an outwardly projecting flange 21 at its inner end which is secured by screws 22 or other suitable means to the cover plate 14. The bushing 20 forms a bearing for a pinion 23 having forwardly projecting clutch teeth 24.

A washer 25 is threaded into the forward end of the bushing 20 and has a flange 26 which prevents forward longitudinal movement of the pinion 23, it being noted that the flange 21 prevents longitudinal movement of said pinion in a rearward direction.

Keys 27 are secured to the shaft 9 at different positions throughout its circumference and are preferably provided with wedge-shaped ends 28 which bear against the washer 25.

A clutch collar 29 is slidably secured to the shaft 9 through the medium of the keys 27, so that said clutch collar 29 rotates with the shaft 9 and moves longitudinally thereon. This clutch collar 29 has clutch teeth 30 which are designed to operatively engage the clutch teeth 24 of the pinion 23, when the clutch collar is moved rearwardly, and thus impart the movement of the shaft 9 to the pinion 23. However, when the clutch collar 29 is moved forwardly, the clutch teeth 24 and 30 will be disengaged and the pinion 23 will remain idle.

The clutch collar 29 is annularly grooved at 31, and a fork 32 extends within said groove. The fork 32 is carried by an arm 33 which is slidable to a limited extent on a clutch shifting rod 34 which is slidably mounted in suitable bearings 35 and 36 in the casing 1.

A collar 37 is secured to the rod 34, in the present instance by a pin 38, said collar, under conditions hereinafter set forth, being designed to engage and move the arm 34 to disengage the clutch collar 29 from the clutch teeth 24 on the pinion 23. The upper end of the arm 32 is recessed at 39, and a balled end 40 of a lever 41 engages said recess and is designed to move said arm in a direction to cause the engagement of the clutch teeth 24 and 30 to drive the pinion as above stated.

The lever 41 has a fulcrum in the form of a ball 42 which has a bearing in an extension 43 in the top of the casing, the upper end 44 of the lever 41 being engaged by a plunger 45 in a superimposed casing 46, said plunger being movable forwardly by means of a coiled spring 47 positioned within a cavity 48 in said casing 46, the function of said spring 48 being to automatically move said lever 41 to consequently move the arm 32 and clutch collar 29 into operative engagement to effect the driving of said pinion 23.

The end 12 of the primary drive shaft 9 has a cylindrical recess 49 into which extends the forward end 50 of a secondary drive shaft 51, said end 50 being of smaller diameter than the internal diameter of the recess 49 to permit the insertion of roller bearings 52.

The secondary drive shaft is supported at its rear end in a ball bearing 53, said bearing being supported in a housing 54 which is secured to the rear end 55 of the casing 1, a stuffing box 56 being secured to said housing 54 and providing packing 57 designed to prevent leakage of the lubricant out of the casing 1 through the passage necessary for the inclusion of the balls 58.

The rear end 59 of the secondary drive shaft 51 may be connected by universal coupling or other connecting means to a shaft (not shown) which leads to the rear driving gears of the automobile. The shaft 51 is provided with two sets of keys 60 and 61 which are spaced at intervals around its circumference in a manner similar to the keys 27 on the primary drive shaft 9.

Clutch collars 62 and 63 slide longitudinally of said secondary shaft 51 and are caused to rotate with said shaft through the medium of said keys 60 and 61. The clutch collar 62 has clutch teeth 64 which are designed when it is moved forwardly, to engage clutch teeth 65 on the inner end 12 of the shaft 9. The clutch collar 62 also has clutch teeth 66 which, when it is moved in a rearward direction, engage clutch teeth 67 on the forward face of a gear 68, the latter being loosely mounted on the shaft 51. The clutch collar 62 is movable in opposite directions, longitudinally of the shaft 51, by means of a fork 69 which engages an annular groove 70 in said clutch collar 62.

The fork 69 extends from an arm 71 which is secured to the clutch shifting rod 34. The clutch collar 63 has clutch teeth 72 which when it is slid forwardly, engages clutch teeth 73 on a gear 74, the latter gear being loose on the shaft 51. The clutch collar 63 also has clutch teeth 75 which, when it is moved in a rearward direction, engages clutch teeth 76 on a reverse gear 77, the latter also being loosely mounted on the shaft 51.

Each of the gears 68, 74, and 77 is provided with a ball bearing preferably of the "S. K. F. type," each of said bearings consisting of an inner sleeve 78 which is secured to the shaft 51 and an outer sleeve 79 which is secured within a recess or cavity in a respective gear.

Balls 80 are interposed between the sleeves 78 and 79 and thus permit rotary movement of the gears, but prevent longitudinal movement of said gears along the shaft 51.

It will be noted that in the drawings, the clutch collars 62 and 63 are shown in a neutral position, and when in this position do not engage any of the clutch teeth which they are intended to engage when moved longitudinally as hereinafter more fully described.

A jack shaft 81 is mounted in suitable ball bearings 82 and 83 in opposite ends of the casing 1, said jack shaft being free to rotate but is prevented of any longitudinal movement due to the engagement of the ends of the shaft with the bearings.

Gear wheels 84, 85, 86, and 87 are secured to the jack shaft 81 by means of a key 88 mounted within said shaft 81. The gears 84, 85, 86, and 87 are further held against longitudinal movement by spacing sleeves 89, 90, and 91, the sleeve 89 being interposed between the hub of the gear 84 and the bearing 82. The sleeve 90 extends between the gears 84 and 85 and engages the hubs of said gears, while the sleeve 91 extends between the gears 86 and 87 and engages their respective hubs, so that it will be understood that the gears 84, 85, 86, and 87 do not have any longitudinal movement nor do the gears 68, 74, and 77, or the pinion 23.

The pinion 23 is in mesh at all times with the gear 84, the gears 68 and 74 being respectively in mesh with the gears 85 and 86 at all times. The gear 87 meshes with an intermediate gear 92 which is rotatably mounted on a stud or arbor 93 secured to the inner surface of the casing (see Fig. 3), and this intermediate gear 92 meshes at all times with the reverse gear 77.

The clutch collar 63 has an annular groove 94 into which extends a fork 95 which projects from an arm 96, the latter being secured on a second clutch shifting rod 97, said rod being slidable longitudinally in suitable bearings in the casing 1. The clutch shifting rods 34 and 97 are mounted in substantially the same horizontal plane and are spaced apart as clearly shown in Figs. 2 and 3.

The rod 34 has a sleeve 98 secured thereon, said sleeve being secured to the arm 71. The sleeve 98 has an inwardly projecting extension 99 (see Fig. 4), said extension having a recess 100 which is normally directly opposite a recess 101 in an extension 102 on a sleeve 103, the latter being secured to the rod 97. A clutch shifting lever 104 has a ball and socket connection 105 in the superimposed casing 46, and the lower end of the lever 104 extends between the rods 34 and 97 and is designed to engage either of the recesses 100 or 101 so that the lever 104 may be moved into either recess and after it has been so moved, it may be further moved to slide either of the rods 34 and 97 longitudinally in either direction.

Spring-pressed plungers 106 and 107 are designed to engage any of a series of notches 108, 109, and 110 formed in each of the rods 34 and 97, the function of said spring-pressed plungers 106 and 107 being to prevent accidental movement longitudinally of the rods 34 and 97 and to hold said rods in the positions into which they have been moved by the lever 104. As illustrated, the plunger 106 is shown in engagement with the notch 109 which is the neutral position for the clutch collars 62 and 63, while the spring 47 is operative to hold the clutch collar 29 into operative engagement with the clutch teeth on the pinion 23 so that the rotation of the primary drive shaft 9 will effect the rotation of the pinion 23 and consequently the jack shaft 81 through the medium of the gear 84.

It will be further noted that in this position the collar 37 is in engagement with the arm 32, so that a movement of the rod 34 in a forward direction will cause the collar 37 to move the arm 32 forwardly against the action of the spring 47 and to disengage the collar 29 from the pinion 23. Furthermore, said movement of the rod 34 will cause the arm 71, through the medium of the fork 69, to move the clutch collar 62 into operative engagement with the clutch teeth 65 on the end of the shaft 9 and that the movement of said shaft 9 will be imparted directly to the secondary shaft 51. However, when the clutch collar 62 is moved rearwardly, the spring 47 will act to move the clutch collar 29 again into operative engagement with the pinion 23 and thereby effect movement of the jack shaft and uncouple the primary drive shaft from the secondary drive shaft. A movement of the clutch collar 62 to the rear of its neutral position will cause it to operatively engage the clutch teeth 67 of the gear 68, and since the latter gear is also rotated due to the engagement of the clutch collar 29 with the pinion 23 as hereinbefore stated, the movement of the gear 68 will be imparted to the clutch collar 62 and thence through the medium of the keys 60 to the secondary shaft 51.

On the other hand, if, after the clutch collar 62 has been returned to its normal position, the lever 104 is moved into engagement with the recess 101 in the sleeve 103, and then moved to shift said rod 97 in a forward direction, the clutch collar 63 will be moved into an operative engagement with the clutch teeth 73 of the gear 74. With this connection, power will be transmitted through the medium of the jack shaft, gears 86 and 74 and clutch collar 63 to rotate the shaft 51, it being of course understood that the spring 47 is normally operative to cause the rotation of said pinion through the medium of the clutch collar 29.

If the clutch shifting rod 97 is moved rearwardly by the lever 104, the clutch sleeve 63 will be moved into operative engagement with the clutch teeth 76 on the reverse gear 77, and hence the movement will be imparted through the gear 87 on the jack shaft, thence through the intermediate gear 92 and gear 77, and the clutch collar 63, and with this connection the secondary shaft 51 will be rotated in a direction opposite to that of the primary shaft 9.

It will be noted that the pair of gears 85 and 68 are of different relative diameters than are the gears 86 and 74. The gear 85 being of larger diameter than the gear 86, will effect the operation of the secondary shaft 51 at greater speed than will the gear 86, and hence the gear 85 imparts what may be termed an "intermediate speed" to the secondary shaft 51, while the gear 86 imparts a slower movement to the shaft 51, and said slower movement being commonly known as "low gear."

It will be noted that when the clutch collar 62 is moved into operative engagement with the clutch teeth 65 on the shaft 9 as above described, the secondary drive shaft 51 will rotate in unison with the primary drive shaft 9, and with this connection said shaft 51 will be driven at "high" speed.

With the elements positioned as shown in the several figures of drawing, the motion of the primary drive shaft 9 is imparted to the jack shaft 81, but since there is no clutch connection with any of the gears on the secondary shaft 51, the latter will remain idle and the gears 68, 74, and 77 will rotate loosely on said secondary shaft without rotating it.

To start the secondary shaft 51 in motion, the lever 104 is moved to slide the clutch collar 63 in engagement with the clutch teeth 73 of the gear 74. The secondary shaft will then be rotated at the lowest speed. After the secondary shaft has attained the desired momentum, the lever 104 may be moved to actuate the clutch collar 62 and move the latter into engagement with the clutch teeth 67 of the gear 68 to thus impart an intermediate speed.

To secure high speed, the lever 104 is moved to rod 34 forwardly, thereby causing disengagement of the clutch collar 29 with the clutch teeth 24 of the pinion 23 and the movement of the clutch collar 62 into operative engagement with the clutch teeth 65. Then the secondary shaft 51 will be directly coupled to the primary drive shaft 9.

In order to secure a reverse direction of the secondary shaft 51, the clutch collar 62 is moved to neutral by the operation of the lever 104 and the latter is then moved to rearwardly slide the rod 97 to effect movement of the clutch collar 63 into operative engagement with the clutch teeth 76 of the gear 77. It will thus be seen that the movement of the lever 104 is similar to that employed by automobiles of different types now on the market in which a single lever is operative to secure different speeds forward and a reverse to the shaft which operates the driving wheels.

My invention is of comparatively simple and durable construction and is practically operative in all places where hard usage may be expected. In Fig. 6, the elements are practically of the same construction as those described in connection with Figs. 1 to 5 inclusive, with the exception that the clutch shifting rods 34 and 97 are more widely spaced and a spring which corresponds in service to the spring 47 above noted, is differently housed and the lever 41 is eliminated.

The other differences between Fig. 6 and the above described elements is comparatively slight, and in the following description I will briefly describe only such parts as differ from the above mentioned mechanism and will give the remaining elements the reference numerals corresponding with those above given them.

A sleeve 111 is slidable within an opening 112 in a casing 113, the latter corresponding in function to the casing 1 above mentioned. The sleeve 112 has an annular flange 114 which is designed to move within a cap 115 threaded onto a projection 116 on the casing 113.

A coiled spring 117 is mounted within the cap 115 and is designed to bear upon the outer closed end thereof, and the flange 114 of the sleeve 112. The inner end of the sleeve 112 is designed to engage the arm 32 and to normally press said arm against the collar 37. The spring 117 acts in the same capacity as the spring 47 to move the arm 32 when permitted to do so by the rearward movement of the collar 37 and rod 34, the latter having its forward end slidable through the sleeve 112 and forward end of the cap 115. The primary drive shaft 9 in the present instance is shown connected to a universal joint 118 which, in turn, may be connected to a shaft leading from the motor which is in the forward part of the machine, it being remembered that Fig. 6 shows a construction embodying my invention which is particularly designed to be located adjacent the rear of an automobile or other motor driven vehicle.

The rear end of the secondary drive shaft 51 is in the present instance provided with a beveled pinion 119 which meshes with a beveled gear 120 designed to drive the rear axle or wheels of the vehicle, and may be of any of the well known constructions.

In Fig. 7, I have illustrated a modified form of the means which control and effect the automatic movement of the clutch shifting rod 34. Said means include a spring 121 and a sleeve 122, the latter being forced on the rod 34 so as to be rigidly fixed thereto. This sleeve is slidably mounted within the casing 1, and the spring 121 is interposed between the inner end of the sleeve 122 and the end of an arm 33ª, the latter being slidable on the rod 34 in a manner substantially similar to the arm 33 and has a fork 32ª in engagement with the groove 31 on the clutch collar 29.

In all other respects the elements shown in Fig. 7 are substantially similar to those described in connection with Figs. 1 to 5 inclusive, and I have therefore given like parts similar reference numerals.

While I have described the forms of casing for my improved mechanism as of particular shape to be positioned at the forward and rear ends of a vehicle, it will be noted that I may use my invention with advantage at points intermediate if I so desire.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A gear transmission mechanism, comprising a primary drive shaft, a secondary drive shaft, a jack shaft, gears rigidly fixed to the jack shaft, a fixed bearing, a pinion rotatable loosely on said bearing and in constant mesh with one of the gears on said jack shaft, gears loosely rotatable on said secondary shaft and respectively in constant mesh with other of said gears on the jack shaft, clutch means adapted to operatively connect the secondary shaft to the primary shaft and to any of said gears on the secondary shaft, and means rotatable in conjunction with said primary shaft and movable into driving operation with the pinion on said primary shaft, substantially as described.

2. A gear transmission mechanism, comprising a primary drive shaft, a secondary drive shaft, a jack shaft, gears rigidly fixed to the jack shaft, a fixed bearing, a pinion rotatable loosely on said fixed bearing and in constant mesh with one of the gears on said jack shaft, gears loosely rotatable on said secondary shaft and respectively in constant mesh with other of said gears on the jack shaft, clutch means adapted to operatively connect the secondary shaft to the primary shaft and to any of said gears on the secondary shaft, said pinion having clutch teeth thereon, and a member slidably keyed to said primary shaft and having a portion for engagement with said clutch teeth on the pinion, substantially as described.

3. A gear transmission mechanism, comprising a primary drive shaft, a secondary drive shaft, a jack shaft, gears rigidly fixed to the jack shaft, a fixed bearing, a pinion rotatable loosely on said bearing and in constant mesh with one of the gears on said jack shaft, gears loosely rotatable on said secondary shaft and respectively in constant mesh with other of said gears on the jack shaft, clutch means adapted to operatively connect the secondary shaft to the primary shaft and to any of said gears on the secondary shaft, means rotatable in conjunction with said primary shaft and movable into driving operation with said pinion and means for automatically moving and holding said clutch means in operative engagement with said pinion to drive the latter, substantially as described.

4. A gear transmission mechanism comprising a primary drive shaft, a secondary drive shaft, a jack shaft, gears rigidly fixed to the jack shaft, a fixed bearing, a pinion rotatable loosely on said bearing and in constant mesh with one of the gears on said jack shaft, a gear loosely rotatable on said secondary shaft and in constant mesh with one of said gears on said jack shaft, said gear on the secondary shaft having a clutch engaging portion thereon, means rotatable in conjunction with said primary shaft and movable into driving operation with the pinion on said primary shaft, said primary shaft having a clutch engaging portion thereon, and means rotatable in conjunction with said secondary shaft and movable into operative engagement with either the clutch engaging means on said primary shaft or the clutch engaging portion on said gear on the secondary shaft, substantially as described.

5. A gear transmission mechanism comprising a primary drive shaft, a secondary drive shaft, a jack shaft, gears rigidly fixed to the jack shaft, a fixed bearing, a pinion rotatable loosely on said bearing and in constant mesh with one of the gears on said jack shaft, a gear loosely rotatable on said secondary shaft and in constant mesh with one of said gears on said jack shaft, said gear on the secondary shaft having a clutch engaging portion thereon, means rotatable in conjunction with said primary shaft and movable into driving operation with the pinion on said primary shaft, said primary shaft having a clutch engaging portion thereon, means rotatable in conjunction with said secondary shaft and movable into operative engagement with either the clutch engaging means on said primary shaft or the clutch engaging portion on said gear on the secondary shaft, a common means for moving the clutch engaging means on the primary shaft and the clutch engaging means on the secondary shaft in one direction, and automatic means for moving one of said clutch engaging means in an opposite direction, substantially as described.

6. A gear transmission mechanism comprising a primary drive shaft, a secondary drive shaft, a jack shaft, gears rigidly fixed to the jack shaft, a fixed bearing, a pinion rotatable loosely on said bearing and in constant mesh with one of the gears on said jack shaft, a gear loosely rotatable on said secondary shaft and in constant mesh with one of said gears on said jack shaft, said gear on the secondary shaft having a clutch engaging portion thereon, means rotatable in conjunction with said primary shaft and movable into driving operation with the pinion on said primary shaft, said primary shaft having a clutch engaging portion thereon, means rotatable in conjunction with said secondary shaft and movable into operative engagement with either the clutch engaging means on said primary shaft or the clutch engaging portion on said gear on the secondary shaft, a common means for moving the clutch engaging means on the primary shaft and the clutch engaging means on the secondary shaft in one direction to move said clutch engaging means on the primary shaft out of operative engagement with said pinion and to move the clutch engaging means on said secondary shaft into operative connection with the clutch engaging portion of the primary shaft, and automatic means operative to move the clutch engaging means on the primary shaft into operative engagement with the pinion, said automatic means being operative when said clutch engaging means on the secondary shaft is moved out of connection with the clutch engaging portion on the primary shaft, substantially as described.

7. A gear transmission mechanism comprising a primary drive shaft, a secondary drive shaft, a jack shaft, gears rigidly fixed to the jack shaft, a fixed bearing, a pinion rotatable loosely on said bearing and in constant mesh with one of the gears on said jack shaft, a gear loosely rotatable on said secondary shaft and in constant mesh with one of said gears on said jack shaft, said gear on the secondary shaft having a clutch engaging portion thereon, means rotatable in conjunction with said primary shaft and movable into driving operation with the pinion on said primary shaft, said primary shaft having a clutch engaging portion thereon, means rotatable in conjunction with said secondary shaft and movable into operative engagement with either the clutch engaging means on said primary shaft or the clutch engaging portion on said gear on the secondary shaft, a common means for moving the clutch engaging means on the primary shaft and the clutch engaging means on the secondary shaft in one direction to move said clutch engaging means on the primary shaft out of operative engagement with said pinion and to move the clutch engaging means on said secondary shaft into operative connection with the clutch engaging portion of the primary shaft, and automatic means operative to move the clutch engaging means on the primary shaft into operative engagement with the pinion, said automatic means being operative when said clutch engaging means on the secondary shaft is moved out of connection with the clutch engaging portion on the primary shaft, said common means having a member operative in conjunction therewith and designed to resist the action of said automatic means during the movement of the clutch engaging means on the secondary shaft out of engagement with the clutch engaging portion on the primary shaft, substantially as described.

8. A gear transmission mechanism comprising a primary drive shaft, a secondary drive shaft, a jack shaft, gears fixed to the jack shaft, a loose pinion in constant mesh with one of the gears on said jack shaft, a gear loosely rotatable on said secondary shaft and in constant mesh with one of said gears on said jack shaft, said gear on the secondary shaft having a clutch engaging portion, clutch engaging teeth on said primary shaft, a clutch collar slidably keyed on the secondary shaft, a clutch collar slidably keyed on the primary shaft, a clutch portion on said pinion, a shifting rod, an arm slidable longitudinally on said shifting rod, a collar secured to said rod for abutment with said arm, a spring operative to actuate said arm to move said latter clutch collar into engagement with said pinion, and an arm secured to said shifting rod for moving the other of said clutch collars in opposite directions to alternately connect the primary shaft and the gear on the secondary shaft, said collar on the rod being adapted, when the clutch collar on the secondary shaft is moved into operative engagement with the primary shaft, to engage the first mentioned arm and thereby move the primary shaft clutch out of engagement with the pinion, substantially as described.

9. A gear transmission mechanism comprising a primary drive shaft, a secondary drive shaft, a jack shaft, four gears fixed to the jack shaft, a loose pinion in constant mesh with one of the gears on said jack shaft, three gears loosely rotatable on said secondary shaft two of which are respectively in constant mesh with two of said gears on said jack shaft, an intermediate gear in constant mesh with the other gears on said jack and secondary shaft, one of said gears on the secondary shaft having a clutch engaging portion, clutch engaging teeth on said primary shaft, a clutch collar slidably keyed on the secondary shaft, a clutch collar slidably keyed on the primary shaft, a clutch portion on said pinion, a shifting rod, an arm slidable longitudinally on said shifting rod, a collar secured to said rod for abutment with said arm, a spring operative to actuate said arm to move said latter clutch collar into engagement with said pinion, an arm secured to said shifting rod for moving the other of said clutch collars in opposite directions to alternately connect the primary shaft and said latter mentioned gear on the secondary shaft, said collar on the rod being adapted, when the clutch collar on the secondary shaft is moved into operative engagement with the primary shaft, to engage the first mentioned arm and thereby move the primary shaft clutch out of engagement with the pinion, a second shifting rod, a third clutch collar slidably keyed to the secondary rod and movable into clutching engagement with the other two of said three gears on the secondary shaft, members movable in conjunction with said shifting rods and having notches therein, and an actuating rod adapted to be moved into either of said notches to move either of said shifting rods to actuate their clutch collars, substantially as described.

In testimony whereof I have signed my name to this specification in the presence of two subscribing witnesses.

FRANK H. CATHCART.

Witnesses:
 FANNIE MANDERBACH,
 ANNETTE MARKHAM.